United States Patent [19]

Beneze

[11] 4,378,204
[45] Mar. 29, 1983

[54] MOLD FOR MAKING TIRES

[75] Inventor: Heinz W. Beneze, Akron, Ohio

[73] Assignee: The Firestone Tire & Rubber Company, Akron, Ohio

[21] Appl. No.: 359,647

[22] Filed: Mar. 19, 1982

Related U.S. Application Data

[62] Division of Ser. No. 233,424, Feb. 11, 1981, Pat. No. 4,341,251.

[51] Int. Cl.³ .......................... B29F 1/00; B29H 5/06; B29H 3/08; B29H 5/18
[52] U.S. Cl. ................................... 425/577; 425/542
[58] Field of Search ................ 425/577, 542; 264/326

[56] References Cited

U.S. PATENT DOCUMENTS 2,825,383  3/1958  Spelman .
4,286,942  9/1981  Fuzioka et al. ................. 425/577

Primary Examiner—J. Howard Flint, Jr.
Attorney, Agent, or Firm—Ernst H. Ruf

[57] ABSTRACT

A tire (10) produced via a molding or casting process in a manner such that each of its bead areas (16) includes an annular slot (42) whereby the slots permit the insertion of an inextensible annular reinforcement element (40) into each of the bead area slots (42) after the molding or casting process. Slots (42) are preferably produced by the addition of annular collars (64) to either the outer member (50) or core member (60) of an improved molding or casting die (48). The improved molding or casting process includes a step of forming a circumferential slot (42) in each tire bead area (16), with these slots (42) permitting the addition of an inextensible annular reinforcement element (40) into each bead area (16) after the molding or casting process.

4 Claims, 6 Drawing Figures

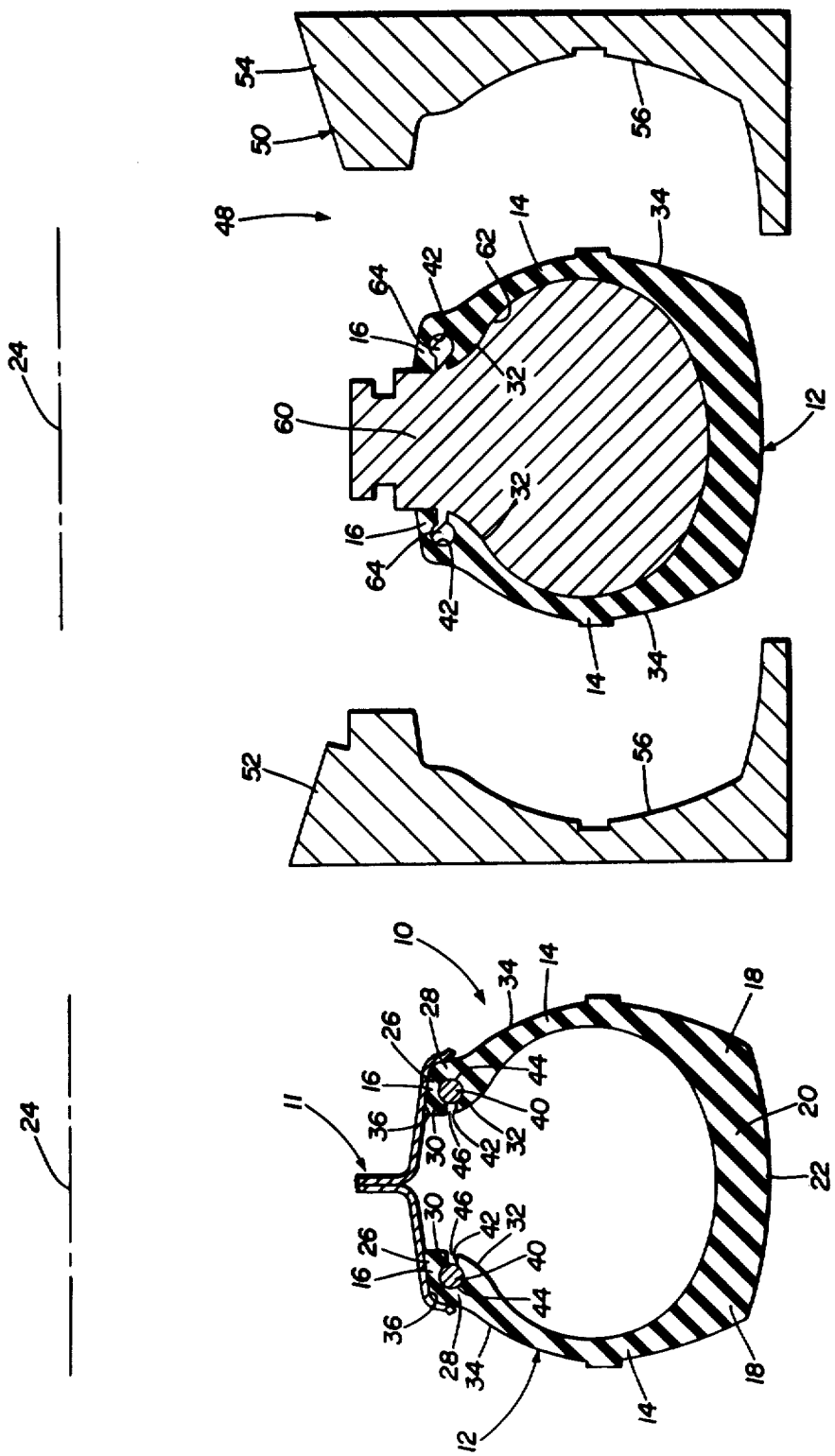

MOLD FOR MAKING TIRES

This application is a division of application Ser. No. 233,424, filed Feb. 11, 1981, now U.S. Pat. No. 4,341,251, issued July 27, 1982.

TECHNICAL FIELD

The field of art to which this invention pertains is that of cast or molded tires comprised of a body without reinforcing cords, made of viscoelastic material.

All tires, regardless of their method of manufacture, require reinforcing elements, commonly referred to as bead wires, embedded in the bead portions of tires in order to retain each tire on the rim of a wheel when the tire is inflated and in use. Thus, these reinforcement elements serve to assure the firm adherence of the tire to the rim. Preferably the annular reinforcement elements are constituted by at least one shaped metallic element, most often having a circular section or by a metal cord of generally circular cross section comprising a plurality of metal wires twisted together. These inextensible reinforcement elements both retain the tire on the wheel rim and in sealing relationship therewith.

In all known tire building processes, the reinforcement elements become integral parts of the tire body. This holds true for bias as well as radial tires and for tires of conventional construction as well as tires produced by casting or molding processes.

In known processes, cast or molded tires require the placement of the reinforcement elements inside the mold prior to casting, with the reinforcement elements being held inside the mold by bead clips or locating blocks in the manner set forth in U.S. Pat. No. 3,381,736 to Ford, et al. While filling the mold, the reinforcement elements are fully embedded in and thus become a permanent part of the cast tire.

Therefore, the diameter of the reinforcement elements forms a rigid gate or boundary element through which the mold core has to be removed. The use of metal cores is preferred over collapsible or elastic cores since the latter do not normally provide the desired degree of accuracy. The use of rigid or metal cores requires segmentation and cores with from 8 to 16 segments have been previously utilized as evidenced in U.S. Pat. No. 3,922,123 to Spragg, et al., entitled "Core Removal Apparatus" and U.S. Pat. No. 4,083,672 to Vaishnav, entitled "Automatic Hub and Apparatus for Disassembly of the Hub," with both of these patents being assigned to the assignee of the present invention.

Not only is the use of segmented cores very cumbersome, as evidenced by the above-noted patents, but the manufacture of segmented cores is both difficult and expensive. Furthermore, the unavoidable gaps between the core segments, which leave flash marks on the inner peripheral surfaces of the tires, may adversely affect the performance of the finished tires. In addition, the sharp corners of the segments tend to cut into the toe area of the tire when the segments are removed subsequent to the casting process. A rigid one piece core will not mar the inside of the tire and will not cut the toe area of the tire as it is removed therefrom. However, until the advent of the present invention, such a core could not be used since the limiting effect of the integral reinforcement elements prohibited the removal of the core after the casting process. Segmented cores, in addition to being prone to misalignment and wear, may cause performance deficiencies in the finished product. The use of segmented cores also makes for a very cumbersome production process since the mold core and outer members generally need to be preheated prior to their use. The required insertion of the reinforcing members into the mold assembly, just prior to casting, make it difficult to automate this process for mass production.

BACKGROUND ART

U.S. Pat. No. 3,381,736 to Ford, et. al., discloses a bead wire located by means of blocks mounted on the wire with the blocks being made of a material which has similar physical properties to the material of the bead region of the finished tire. Bead wires prepared with such blocks are located, one in each of the bead regions of the tire mold, with polyurethane thereafter being poured into the mold to form the tire. In a similar manner, it is also known to manually locate the reinforcing elements in the casting mold by the use of small bead clips.

. U.S. Pat. No. 3,924,670 to Tangorra, et al., discloses, in FIG. 6, a bead portion of a tire having a circumferential groove therein into which reinforcing strands of metallic wire are positioned. However, the metal wires are wound up in a plurality of parallel coils about the tire bead after the positioning of the bead in its own seat of the wheel rim, with the ends of the metal wires being then connected, by means of conventional known systems, so as to compress the bead against a supporting base of the rim and thereby ensuring the anchorage of the two parts. Thus, the annular reinforcing element basically functions as a retaining ring which is a separate part and is applied after the tire has been seated on the rim. Consequently, the tire can be removed from the rim only after the retainers or annular elements have been initially removed.

U.S. Pat. No. 4,043,370 to Unwin, et al., discloses a seal arrangement for an oval tire and rim wherein the base of the tire is formed with annular steps or grooves, inwardly of the tire sidewalls, for receiving a pair of restraining devices or roll restraining hoops. These hoops seem to accomplish a purpose similar to that of a normal bead reinforcing structure and include elastomeric rings reinforced with wires. This construction appears to be usable only with an oval tire of a hollow toroidal construction, i.e., a construction without the usual tire bead portions.

DISCLOSURE OF THE INVENTION

The present invention provides a solution to the prior art problems pertaining to the casting or molding of pneumatic tires which has heretofore required the use of segmented rigid cores. As noted, all known conventional open-center cast tire constructions and production processes require that the inextensible reinforcement elements, added to the bead portions of the tires, become integral parts of the tire body. The reinforcement member diameters thus form rigid gates through which the rigid segmented core members have to be removed in the manner well known in the art and accompanied by the well known production and performance limitations associated therewith.

The present invention permits the use of a rigid unitary ring-shaped core member and permits its removal from the tire body after the casting or molding process by adding the required inextensible annular reinforcement elements into each of the tire bead areas after the molding or casting process. By inserting the restrictive inextensible reinforcement elements into the tire bead areas after the tire has been cast, or cast and cured, the tire sidewalls can be flexed and moved to the extent that the unitary core member can be removed from the tire interior. The ease of removal of a non-segmented core member from a post-cast tire will depend greatly on the tire dimension as well as its aspect ratio. For example, in the case of a bicycle tire, a unitary rigid metal core can easily be removed by distorting the tire into an oval shape. At the same time, a tire with a high aspect (maximum section height/maximum section width) ratio and a small bead diameter may require the use of heavy duty tools.

In order to permit placement of the reinforcement elements into the cast tire bead areas, in a post-cast operation, the tire bead areas must be produced with a circumferential slot in each of the tire bead areas.

The present invention includes an improved mold or casting die wherein means for producing a circumferential slot in each of the bead areas is added to the die. This may be accomplished by adding a circumferentially extending collar to either the outer mold member or the core member, with these collars protruding into the tire bead areas.

The present invention further includes a pneumatic tire produced via a molding or casting process having a cast body, including two sidewalls terminating in first and second bead portions, in combination with first and second annular inextensible reinforcing elements, with the reinforcing elements being incorporated into the bead portions in a post-cast operation.

The present invention further pertains to a molding or casting process for the manufacture of pneumatic tires wherein the improvement comprises the step of forming a circumferential slot in each of the tire bead areas, with the slots permitting the addition of an inextensible annular reinforcement element into each of the bead areas after the molding or casting process.

Several preferred non-limiting embodiments are shown by way of example in the accompanying drawings and described in detail without attempting to show all the various forms and modifications in which the invention might be embodied. After the reinforcement elements have been inserted into the tire bead slots, the remaining throat or slot openings can be cloesd by filling them with liquid urethane, for example, or by closing the gap with a prefabricated insert or ring member. The features and advantages of the present invention will become more readily understood by persons skilled in the art when following the best mode description in conjunction with the several drawings.

BRIEF DESCRIPTION OF THE DRAWINGS

FIG. 1 represents the cross section of a tire, according to the present invention, mounted on a wheel rim.

FIG. 2 represents the cross section of a tire body together with one embodiment of the mold in which it may be manufactured, showing some of the parts of the mold separated and in sections.

BEST MODE FOR CARRYING OUT THE INVENTION

Figure 3:
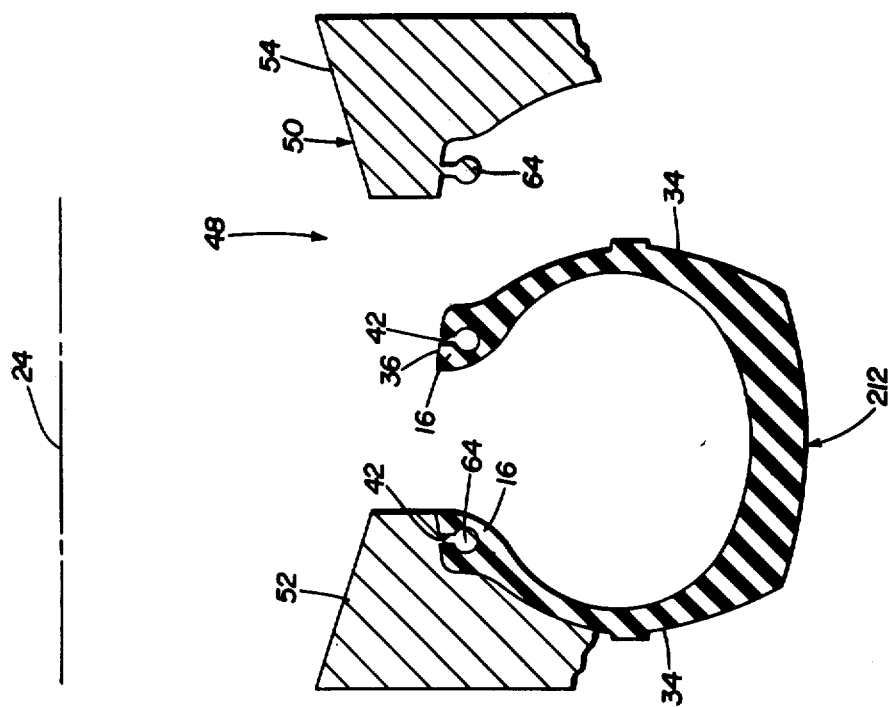
FIG. 3 represents the cross section of another tire body with a cross section, partially broken away, of another embodiment of a mold portion used for making said tire body.

FIG. 1 represents the cross section of a tire shown generically as 10 mounted on any desired type of wheel rim, shown generically as 11. Tire 10 consists of a tire body 12 in combination with bead reinforcement element 40 wherein the former is preferably produced via a molding or casting process such as for example in a centrifugal tire casting machine shown and claimed in U.S. Pat. No. 3,924,982 to Yang, et al. The structure and operation of this machine can be fully understood by persons skilled in the art by reference to the disclosure of said patent which is incorporated herein by reference to the extent necessary to explain known practices in this art.

Tire body 12 is comprised of sidewalls 14 terminating on one end in bead portions or areas 16, with the other ends of sidewalls 14 merging into shoulder areas 18 which in turn merge into crown portion 22 which may include or be provided with an integral or separate tread portion 20. Cast tires of this type have previously been disclosed in U.S. Pat. No. Re. 28,424 to McGillvary and U.S. Pat. No. 3,775,528 to Beneze, for example.

Each tire bead portion 16 terminates in a bead base 26, with the outer intersection of bead base 26 and tire sidewall 14 defining bead heel portion 28 and the inner intersection of bead base 26 and tire sidewall 14 defining bead toe portion 30. Looking at it another way, the ends of tire inner peripheral surface 32 and the ends of tire sidewall outer surface 34 merge into the opposite ends of bead base surfaces 36 so as to define the portion of bead toe positions 30 and bead heel position 30, respectively.

FIG. 1 further shows that tire bead portions 16 are provided with annular or circumferentially extending inextensible reinforcement elements 40, said elements generally comprising at least one shaped metallic element, of generally circular section. However, the shapes, physical configurations or material compositions of reinforcement elements 40 form no part of and are not limited in terms of the present invention.

Annular reinforcement elements 40 are received in tire bead portions 16, preferably being retained by the inner peripheral portion 44 of an annular or circumferentially extending slot constricted, groove or profiled cavity 42. It is desirable that the cross section of the slot peripheral portion 44 is complementary with the cross section of reinforcement element 40 selected to preferably provide at least a 180° surface contact therebetween. As shown in FIG. 1, the throat or opening 46 of slot 42 may be less than the diameter of reinforcement element 40 thereby permitting the press or interference fitting of element 40 within slot portion 44. Tire 10 of FIG. 1 has its slots 42 parallel to its axis of rotation 24, with slot throats 46 being open to the interior of the tire, i.e., slots 42 extending from tire inner surface 32 outwardly into tire bead portion 16.

Turning now to FIG. 2, tire body 12, previously described with reference to FIG. 1, is depicted with one embodiment of a mold or die 48 having an outer mold part or member 50 which has first and second axially separable halves 52 and 54, respectively. Not shown, but readily understood by those skilled in the art, is the fact that mold halves 52 and 54 are operatively mounted on support structures for axial and preferably rotational movement. Outer mold member 50, i.e., mold halves 52 and 54, are provided with an inner surface 56 which is constructed so as to form the outer shape or configuration and thus be complementary with outer surface 34 of tire body 12.

A core part or member 60 is provided for cooperation with outer mold member 50 and is for the purpose of defining the inner shape of the tire which is to be formed in the molding or casting process. Thus, core member outer surface 62 is complementary with tire inner surface 32. The space between core member 60 and outer mold members 52 and 54, when mold or die 48 is in its closed position (not shown), is of course the space which defines the cross section of tire body 12. The formation of slots 42 in bead portions 16 are formed by the addition of first and second annular or circumferentially extending collars 64 laterally extending from core member 60, parallel to tire axis of rotation 24.

Turning now to FIG. 3 embodiment, there is shown tire body 112 and to the extent that this embodiment is the same as previously described tire body 12 (FIGS. 1 and 2), reference is made here to the preceding description, with like numerals being applicable to like parts. Basically, tire body 112 is substantially similar to tire body 12 except that the former, while also having its slots 42 parallel to its axis of rotation 24, has its slots 42 extending from tire outer surface 34 inwardly into bead portions 16. Furthermore, collars 64, forming slots 42, are attached to outer mold half portions 52 and 54 instead of core member 60 in the FIG. 2 embodiment.

Figure 4:
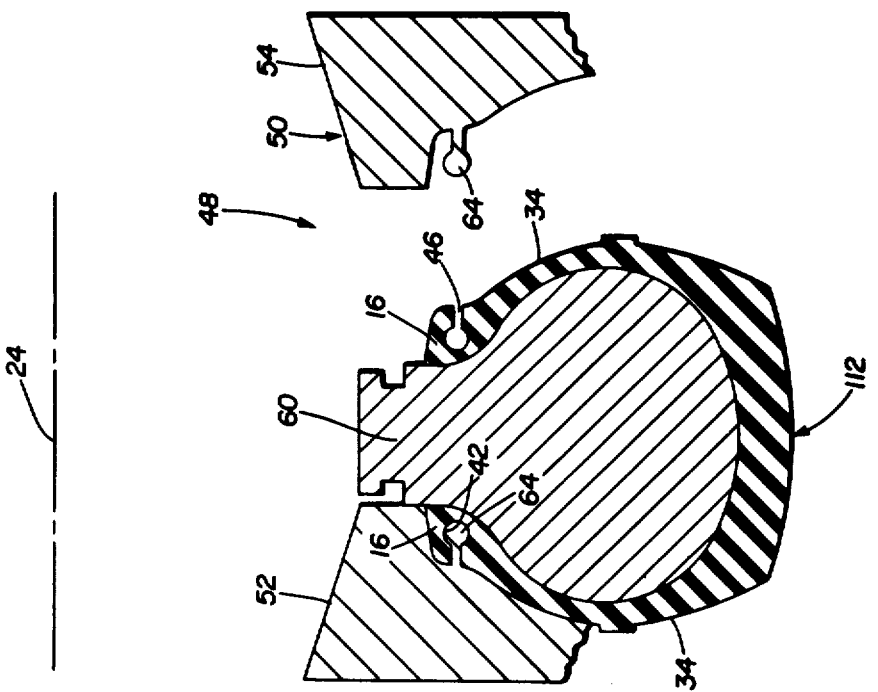
FIG. 4 represents a cross section of a further tire body together with yet a further embodiment, in section and partially broken away, of a mold portion used for manufacturing the tire body.

Turning now to tire body 212 in FIG. 4, this further embodiment is also substantially similar to previously described tire body 12 (FIGS. 1 and 2) and reference is made here to this preceding description, with like numerals being applicable to like parts. This embodiment differs from tire body 112 of FIG. 3, in that slots 42 are perpendicular rather than parallel to the axis of rotation 24 of the tire body, i.e., slots 42 extend from bead base surface 36 radially outwardly into tire bead portions 16. Collar portions 64, attached to outer mold member halves 52 and 54 rather than core member 60 (not shown), are perpendicular to the axis of rotation 24 of tire body 212.

The several embodiments shown in FIGS. 2, 3 and 4 for forming slots 42 are illustrative only and any desired means or process for producing circumferentially extending or annular slots in tire bead portions 16 may be utilized. Collars 64 can be attached or be part of either core member 60 or outer mold half members 52, 54. If so desired, it is also possible to machine slots 42 into the bead areas after production of the tire body.

Figure 5:
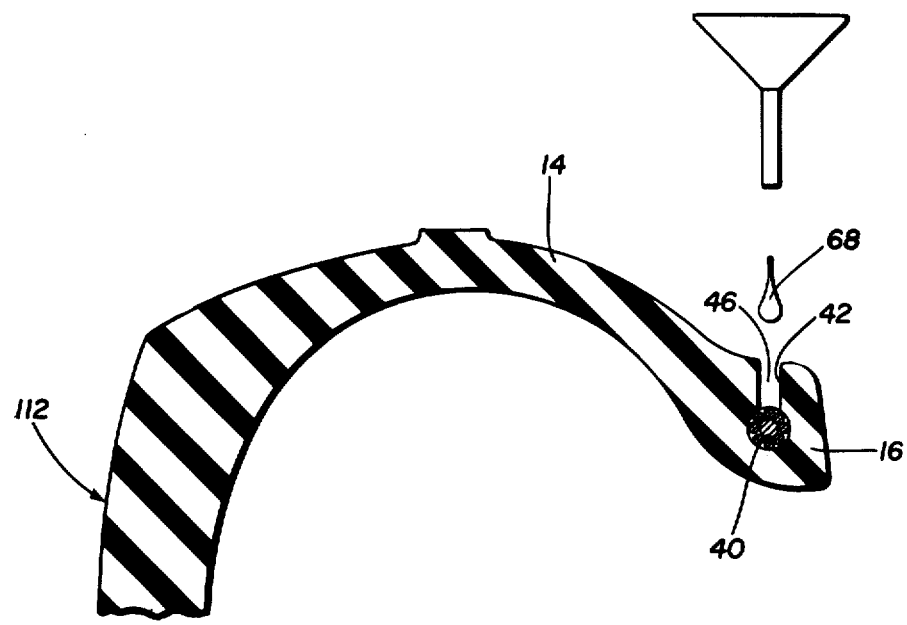
FIG. 5 represents a cross section of a portion of a tire body whose bead slot is being closed after the insertion of its reinforcement element.
Figure 6:
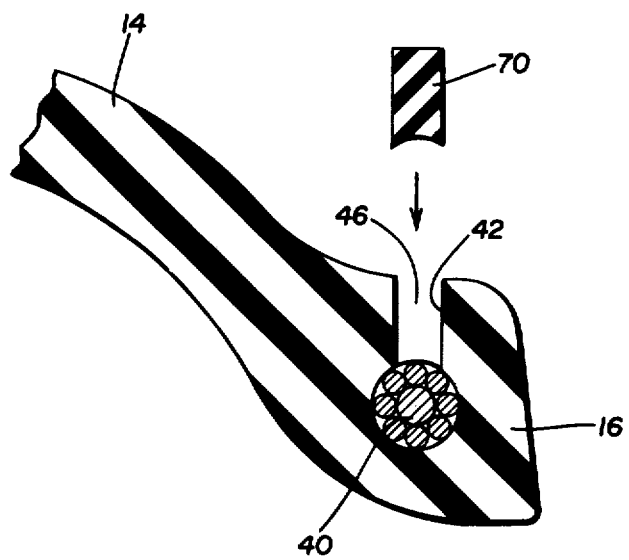
FIG. 6 represents a cross section of a tire body bead portion whose slot is being closed after the insertion of its reinforcement element.

After the casting or molding of a tire body, and after the mold or die has been dismounted or disassembled, reinforcement elements 40 can be inserted into slots 42 either by hand or by using an appropriate tool. In addition, reinforcement elements 40 may be inserted into the tire bodies when the latter are in an as-cast or fully vulcanized or cured condition. Succeeding the insertion of reinforcement elements 40, the remaining throat or slot opening 46 can be closed with a liquid filler 68 (such as urethane, for example), in the manner shown in FIG. 5, or via an insert 70, in the manner shown in FIG. 6.

If slots 42 originate from tire inner surface 32, as shown in FIGS. 1 and 2, slot openings 46, remaining after the insertion of reinforcement elements 40, can remain open and need not be filled since there is no force, after the mounting of the tire on a wheel rim, that tends to dislocate reinforcement elements 40 from groove 42 nor can the air escape from the inside of the tire. An added benefit derived when slot 42 originates from tire inner surface 32 (FIGS. 1 and 2) is that air pressure in the mounted tire (FIG. 1) also acts on remaining open throat portion 46 thereby tending to press bead toe portion 30 against wheel rim 11 and thus assisting in the fluid-tight sealing of the tire to the rim.

From the foregoing description, and the operational discussion, it is believed that those familar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. In a mold for the molding or casting of a pneumatic tire comprising a liquid molded or liquid cast seamless toroidal body of viscoelastic material extending continuously from one annular bead portion to the other, said body encompassing sidewalls and at least a crown area radially inward of an annular road-engaging tread, said sidewalls connecting the lateral edges of said tread to said bead portions, wherein said mold includes first and second outer mold members having circumferentially extending inner surfaces which define at least a circumferential portion of the outer shape of said tire, and a rigid unitary ring-shaped core member, having a continuous circumferentially extending outer surface which defines the inner shape of said tire, said surfaces being spaced apart so as to define a cavity for forming said tire therebetween, wherein the improvement comprises the addition of means for producing an integral circumferential fully constricted slot in each of said bead portions during molding or casting, said constricted slots being one of parallel to the axis of rotation of said tire and perpendicular to the axis of rotation of said tire, in the latter instance each of said constricted slots extending from the base surface of each bead portion of said tire radially into said bead portion, whereby said means for producing have a profiled shape so as to produce said constricted slots with a predetermined opening width to permit a subsequent interference-fitting of an independent unitary annular substantially inextensible reinforcing element into each of said bead portions.

2. The improved mold of claim 1 wherein said means for producing slots include first and second annular profiled collars attached, in the alternative, to said first and second outer mold members, and said core member, said collars protruding into said first and second bead areas.

3. The improved mold of claim 1 wherein said means for producing slots include first and second annular profiled collars attached to said first and second outer mold members, respectively, said collars being perpendicular to the axis of rotation of said tire and extending from the base surface of each bead portion of said tire radially into said bead portion.

4. The improved mold of claim 1 wherein said means for producing slots include first and second annular profiled collars attached to said core member, said collars being both parallel to the axis of rotation of said tire.

* * * * *